(12) United States Patent
Maegawa et al.

(10) Patent No.: US 7,247,060 B2
(45) Date of Patent: Jul. 24, 2007

(54) PLATE FITTED RESIN MOLDED ARTICLE AND METHOD OF MOLDING IT

(75) Inventors: Akihito Maegawa, Yokkaichi (JP); Shinyu Nagashima, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 11/445,974

(22) Filed: Jun. 2, 2006

(65) Prior Publication Data

US 2006/0281371 A1    Dec. 14, 2006

(30) Foreign Application Priority Data

Jun. 10, 2005    (JP)    ............................. 2005-171336

(51) Int. Cl.
*H01R 13/432*    (2006.01)
(52) U.S. Cl. .................. 439/736; 264/259; 264/272.13
(58) Field of Classification Search ................ 439/736; 264/259, 272.13
See application file for complete search history.

(56) References Cited

U.S. PATENT DOCUMENTS 3,856,603 A * 12/1974 Schaefer et al. ............ 156/245
4,738,812 A * 4/1988 Raynal ........................ 264/251
4,971,580 A * 11/1990 Ward et al. .................. 439/595
7,182,901 B2 * 2/2007 Tseng et al. ................. 264/296

FOREIGN PATENT DOCUMENTS

JP    63-149124    6/1988
JP    8-300401    11/1996

* cited by examiner

*Primary Examiner*—Gary F. Paumen
(74) *Attorney, Agent, or Firm*—Gerald E. Hespos; Anthony J. Casella

(57) ABSTRACT

A hydraulic switch body (1) has a metal plate (10) and a resin main portion (20) molded on a first surface (13) of the metal plate (10). A hydraulic switch (2) and busbar circuits (30) are mounted in recesses (21) of the main portion (20). Grooves (22) connect the recesses (21) and the outer peripheral edge of the main portion (20) to release a tensile stress created at the outer surface (14) of the main portion (20) due to a difference between shrinkage ratios of resin and metal during the resin molding to prevent the hydraulic switch body (1) from warping. The lengths of the grooves (22) are shortened by using the recess portions (21). Therefore, the grooves (22) are less likely to hinder the arrangement of other structural parts.

17 Claims, 5 Drawing Sheets

PLATE FITTED RESIN MOLDED ARTICLE AND METHOD OF MOLDING IT

BACKGROUND OF THE INVENTION

1. Field of the Invention

The invention relates to a plate fitted resin molded article and to a molding method therefor.

2. Description of the Related Art

Japanese Unexamined Patent Publication No. H08-300401 discloses an integral article obtained by molding a resin around at least partly around a metal plate. The resin and the metal both shrink when the resin cools and solidifies. However, the shrinkage ratios of the metal and the resin differ. As a result, the integral metal/resin article may warp during cooling. Warping presents particular problems if this technology is applied to an elongated object.

Thought has been given to forming a groove over the entire width of a shorter side of the molded article to prevent warping. However, the groove restricts the placement of other parts and structures, thereby impairing a degree of freedom of design.

The present invention was developed in view of the above problem, and an object thereof is to eliminate a problem of warping while increasing a degree of freedom of arrangement.

SUMMARY OF THE INVENTION

The invention relates to an article that comprises a plate, a resin main portion that is molded to be integral to the plate, and at least one electronic part. The main portion is formed with at least one recess for receiving at least a portion of electronic part. The main portion has at least one groove connecting a peripheral edge of the recess and the outer peripheral edge of the main portion.

The groove enables a release of tensile stress caused by the different thermal expansion and shrinkage characteristics of the plate and resin. As a result, the plate/resin molded article is less likely to warp. The recess that receives the electronic part functions as a part of the groove because the at least one groove extends from the recess to the outer peripheral edge of the main portion. Thus, the groove need not extend over the entire width of the molded article and the shorter groove is less likely to hinder the arrangement of other parts.

The main portion of the subject article preferably is molded to have a plurality recesses for receiving a corresponding plurality of electronic parts. The main portion also preferably is molded with a plurality of grooves connecting the peripheral edges of the recesses and the outer peripheral edge of the main portion.

The recesses preferably are substantially round holes.

The grooves extend at an angle and preferably a substantially right angle to sections of the outer peripheral edge of the main portion extending along the longitudinal direction of the main portion.

The grooves preferably extend towards the centers of the recesses. A groove that aligns with the center of a round recess and that is perpendicular to the peripheral edge will have a minimal length.

At least part of the plate preferably is exposed on an outer surface of the main portion and preferably is made of metal.

The plate preferably has at least one conical or converging hole with diameters that are gradually reduced from the exposed surface of the plate toward an opposite surface of the plate.

At least one anchor preferably is molded integrally with the main portion substantially in conformity with the shape of the hole. The anchor prevents displacement of the metal plate away from the main portion.

A communicating portion for molten resin preferably is provided at the outer edge of the bottom end of the groove.

The invention also relates to a method of molding an article. The method comprises providing a plate, preferably a metal plate, and molding a resin main portion to be integral to at least one side of the plate. The molding step preferably includes forming at least one recess for receiving at least one electronic part and forming at least one groove connecting a peripheral edge of the recess and an outer peripheral edge of the main portion.

The method may also include forming at least one conical or converging hole with a cross-section that is gradually reduced from an exposed surface of the plate toward an opposite surface of the plate.

The molding step may include forming at least one anchor integral with the main portion and substantially in conformity with the hole.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
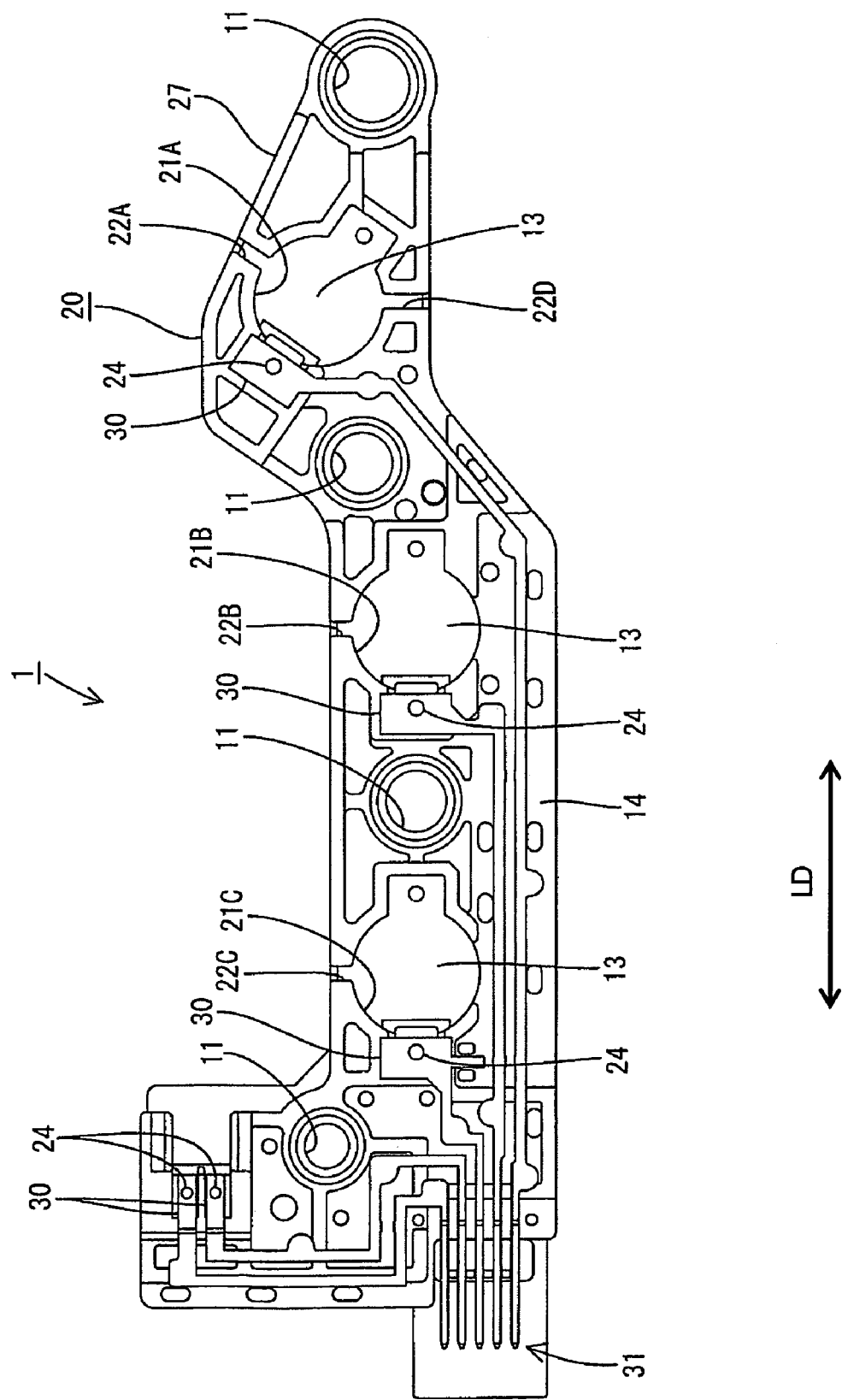
FIG. 1 is a plan view showing a state where busbar circuits are assembled into a main portion according to one embodiment of the invention.
Figure 4:
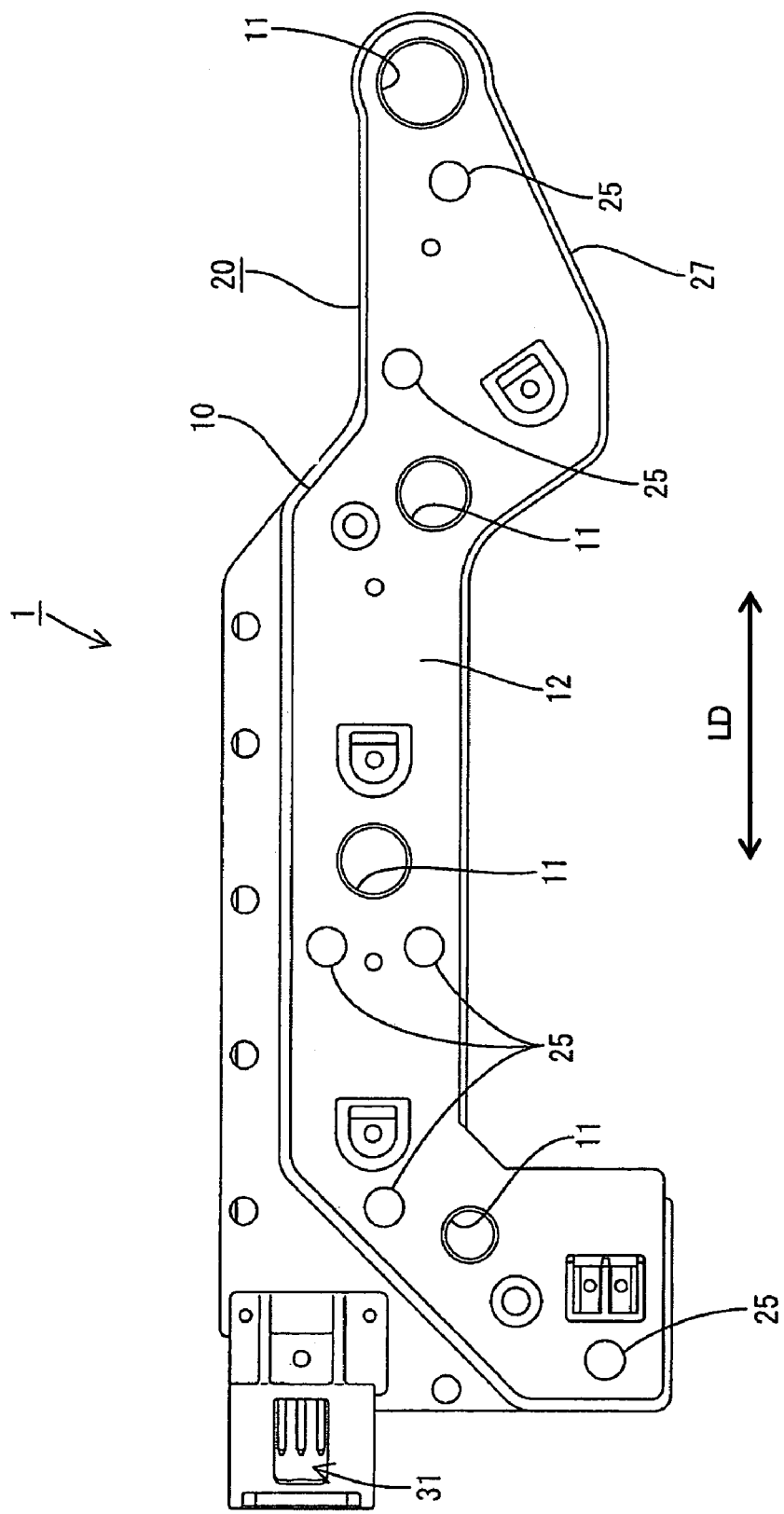
FIG. 4 is a bottom view showing the state of FIG. 3.

A hydraulic switch body according to the invention is identified by the numeral 1 in FIGS. 1 to 6. The hydraulic switch body 1 is to be used while being at least partly immersed in oil in a transmission of an automotive vehicle. In some cases, it may not be immersed in oil depending on an installed state in the vehicle. The interior of the hydraulic switch body 1 is exposed in FIG. 1. However, a cover is mounted to close the interior and/or the interior is embedded or sealed by insert molding to prevent short-circuiting between circuits e.g. due to conductive particles, such as iron powders, mixed in the oil. This hydraulic switch body 1 includes a main portion 20, a hydraulic switch 2, and busbar circuits 30. Specifically, the main portion 20 is a composite member comprised of a conductive metal plate 10 and a resin (preferably glass filled 6, 6-nylon) molded partly around the metal plate 10 so that a first surface 12 of the metal plate 10 is exposed at a rear of the hydraulic switch body 1. However, the metal plate 10 also has a second surface 13 opposite the first surface 12 and at least partly covered by the molded resin. FIG. 1 is a plan view of the hydraulic switch body 1 seen from a side of an outer surface of the conductive metal plate 10 opposite to the exposed surface 12 of the main portion 20, and FIG. 4 is a bottom view of the hydraulic switch body 1 seen from a side of the exposed surface 12 of the conductive metal plate 10.

Four substantially round connection holes 11 and three substantially round recesses 21 are formed alternately formed substantially side by side at specified intervals substantially along longitudinal direction LD in the hydraulic switch body 1 as shown. The recesses 21 include a first recess 21A, a second recess 21B and a third recess 21C extending sequentially from the rightmost position in FIG. 1. The surface 13 of the conductive metal plate 10 opposite to the exposed surface 12 of the conductive metal plate 10 is at least partly exposed at the bottom surfaces of the recesses 21. The connection holes 11 penetrate both the conductive metal plate 10 and the main portion 20 and are used to fix and position the hydraulic switch body 1 to a mating member (not shown) in the transmission.

Figure 2:
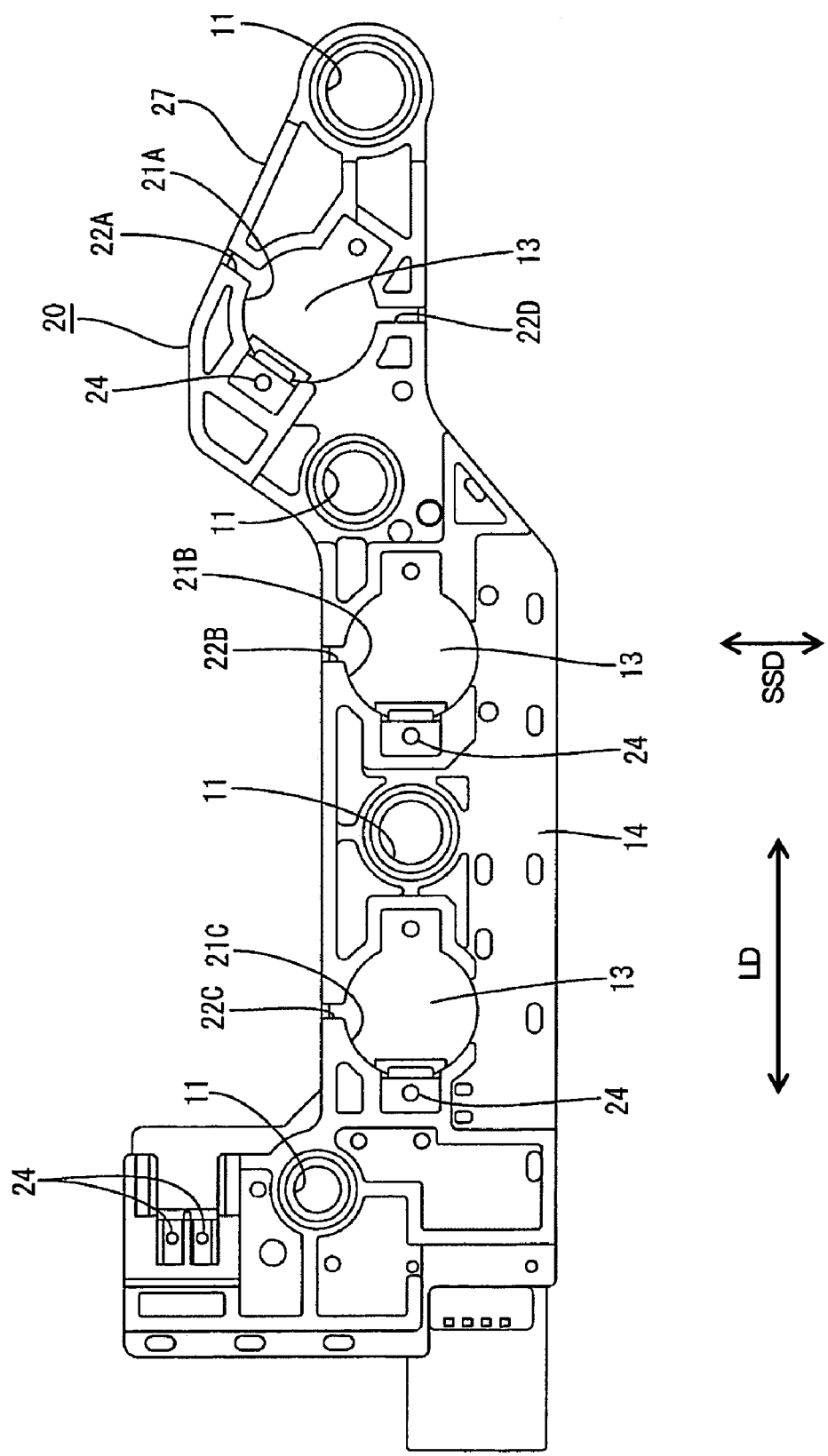
FIG. 2 is a plan view showing the main portion.
Figure 3:
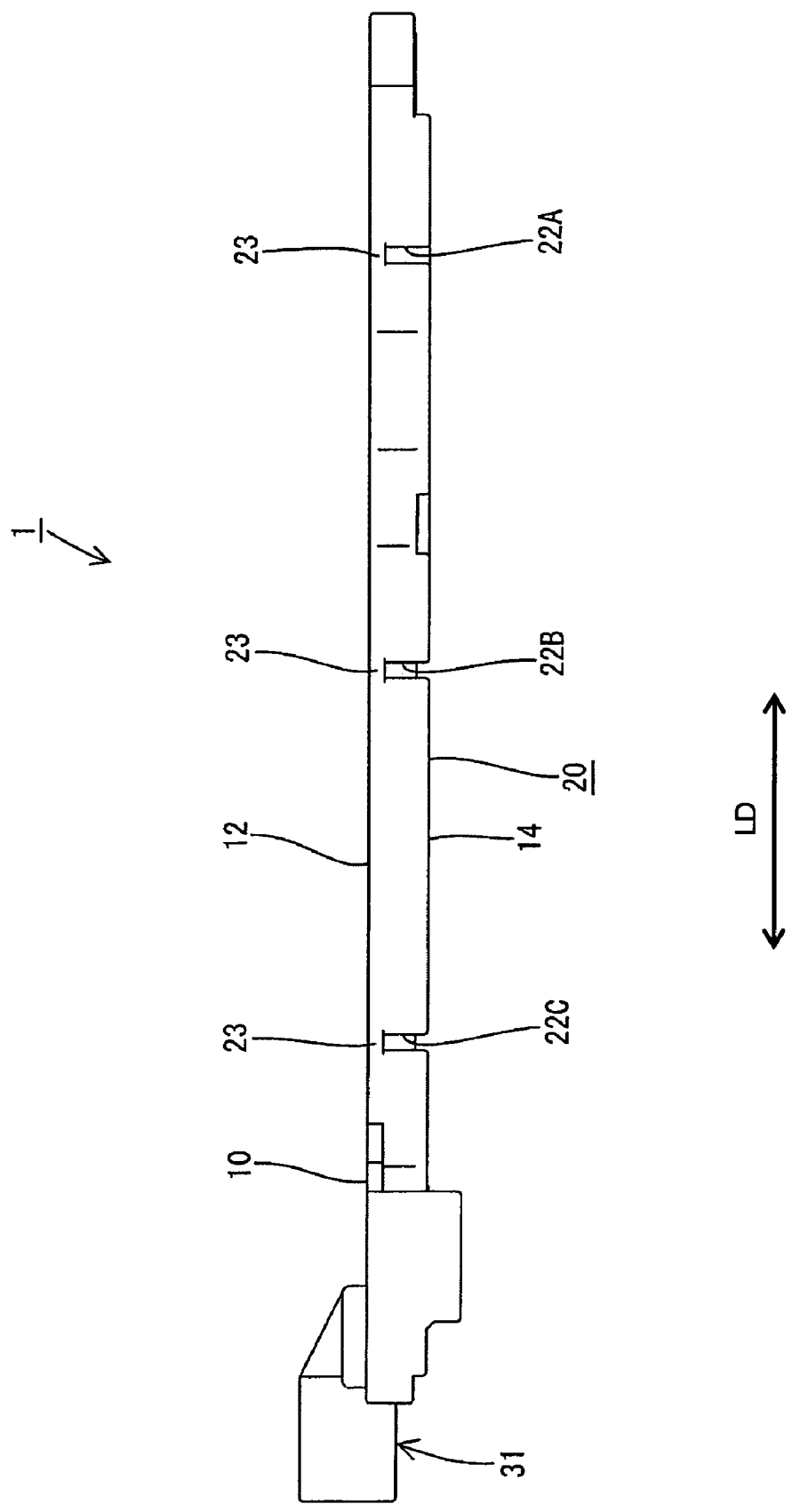
FIG. 3 is a side view showing the state where the busbar circuits are assembled into the main portion.
Figure 6:
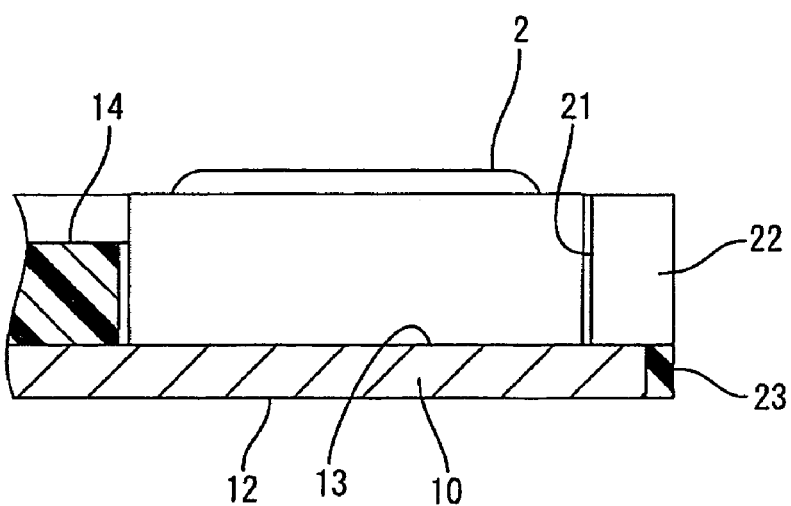
FIG. 6 is a section of a hole.

Five busbar circuits 30 are arranged on the outer surface 14 of the main portion 20. Each busbar circuit 30 has a positioning hole (not shown), and a resin rib 24 projecting on the main portion 20 is inserted into the positioning hole, as shown in FIG. 2, to position the busbar 30. A portion of each resin rib 24 that projects from the positioning hole then is subject to deformation or thermocompression bonding to fix the busbar 30. A connector connecting portion 31 is formed at one end of each busbar 30 and projects laterally to the left at a left bottom side in FIG. 1. The other ends of three busbars 30 are at the opening edges of the corresponding recess 21. FIG. 6 shows a section of the recess 21. The hydraulic switch 2 is mountable in the recess 21 and turns a signal on and off upon receiving pressure from the outer surface 14 of the main portion 20 of the hydraulic switch 2. In this way, the hydraulic switch body 1 is in a pressure-exerted use environment, and the conductive metal plate 10 is used as a backing material because the hydraulic switch body 1 would deform upon receiving a pressure of a specified level if consisting only of a resin portion.

The outer surface of the main portion 20 is formed with four grooves 22 that connect the first, second and third recesses 21A, 21B, 21C and the outer peripheral edge of the main portion 20 as shown. Two grooves 22 are formed at different positions of the first recess 21A, whereas one groove 22 is formed at each of the second and third recesses 21B, 21C at a side opposite an arranged area of the busbars 30 to avoid this arranged area. The grooves 22 extend substantially in a short-side direction SSD and substantially orthogonal to the longitudinal direction LD of the main portion 20. However, the groove 22 formed at an outer edge 27 that is oblique to the longitudinal direction is substantially orthogonal to this outer edge 27. The recesses 21 and the grooves 22 connect to thin the hydraulic switch body 1 in the shorter-side direction SSD and open at the outer peripheral edge of the main portion 20. Thus, tensile stresses created during molding due to a difference between the shrinkage ratios of the resin and the conductive metal is released. Therefore, the warping of the hydraulic switch body 1 can be avoided efficiently.

All of the grooves 22 extend substantially towards the centers of the corresponding recesses 21A to 21C from the outer peripheral edge of the main portion 20. Thus, the lengths of the grooves 22 are shortened maximally to reduce a likelihood of hindering the arrangement of other structural parts. As shown in FIG. 6, a communicating portion 23 for molten resin during the resin molding is provided at the outer edge of the bottom end of each groove 22 and, hence, it is not necessary to provide a die with a gate for molding.

Figure 5:
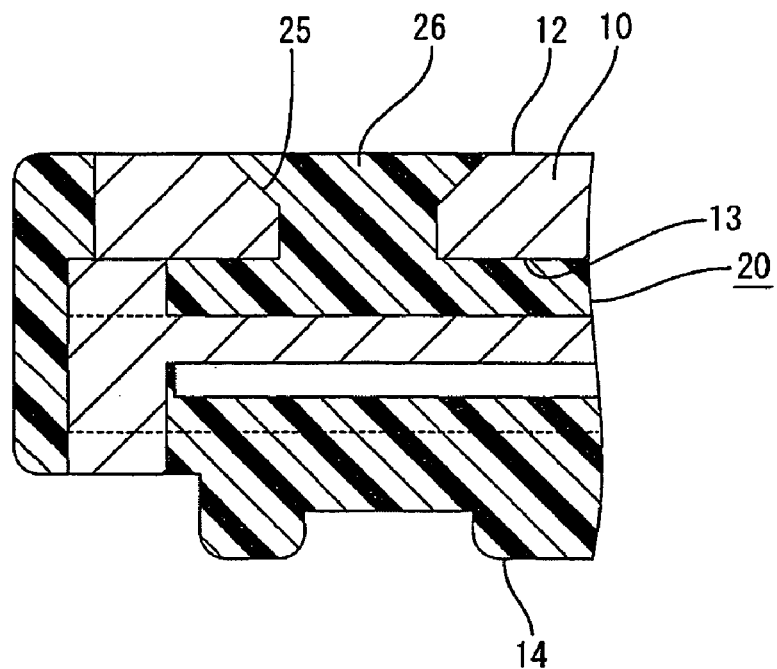
FIG. 5 is a section showing a recess and a groove.

As shown in FIG. 4, six holes 25 penetrate the conductive metal plate 10 around the four connection holes 11. As shown in FIG. 5, each hole 25 has a conical shape oriented to gradually reduce its diameter from the exposed surface 12 of the conductive metal plate 10 toward the opposite surface 13. An anchor 26 is molded unitarily to the main portion 20 and extends at least partly inside the hole 25. The anchor 26 prevents the conductive metal plate 10 from moving away from the main portion 20.

The conductive metal plate 10 is set in a forming die. Molten resin having an increased temperature (e.g. of about 230° C.) then is poured into the die at the side of the opposite surface 13 of the conductive metal plate 10. The die is cooled and the molten resin therein is solidified to form the main portion 20. The cooling creates a tensile stress near the outer surface 14 of the main portion 20 due to a difference between the shrinkage ratios of the resin and the conductive material. However, the grooves 22 connect the outer peripheral edge of the main portion 20 and the peripheral edges of the recesses 21 to release the tensile stress. Thus, the main portion 20 is not likely to warp. If the grooves 22 were formed over the entire direction of the hydraulic switch body 1 along the shorter-side and without using the recesses 21, then the other structural parts would have to be arranged in other places. However, in this embodiment, the recesses 21 function as parts of the grooves 22. As a result, the grooves 22 are shorter and do not hinder the arrangement of the other structural parts. Further, this embodiment does not require a die with a gate for molding because the communicating portions 23 are provided at the outer edges of the bottom ends of the grooves 22 to accommodate the molten resin during molding. Furthermore, the grooves 22 are arranged along the shorter-side direction SSD of the main portion 20 and extend substantially towards the centers of the recesses 21. Thus, the grooves 22 have a minimal length and a change in the arrangement of the other structure parts can be avoided.

On the other hand, the conductive metal plate 10 is formed with conical holes 25 that gradually reduce their diameters from the exposed surface 12 toward the opposite surface 13. Furthermore, anchors 26 are formed unitary to the main portion 20 and extend into the holes 25 to prevent the conductive metal plate 10 from moving away from the main portion 20.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

The conductive metal plate is exposed on the outer surface of the main portion in the foregoing embodiment. However, the metal plate need not be exposed and the invention is applicable to a case where the conductive metal plate is embedded in the main portion.

The grooves penetrate the main portion except the communicating portions for the molten resin during the molding in the foregoing embodiment. However, the grooves need not necessarily penetrate if being capable of solving the warping problem, and thin resin layers may remain at the bottoms of the groove portions and the recesses.

The invention has been described with respect to a conductive plate made of metal and embedded in a resin main portion. However, the invention is applicable to other kinds of plates, conductive or non-conductive, having a different temperature expansion/shrinkage behavior or different temperature expansion factor than the resin used for the main portion e.g. a different shrinkage behavior when cooling down.

What is claimed is:

1. A plate fitted resin molded article, comprising:
   a plate;
   a resin main portion molded to be integral to the plate, the main portion being formed with at least one recess;
   at least one electronic part mounted in the recess; and
   at least one groove formed in the main portion and extending from a peripheral edge of the recess to an outer peripheral edge of the main portion.

2. The plate fitted resin molded article of claim 1, wherein the recess is a substantially round hole.

3. The plate fitted resin molded article of claim 1, wherein the groove extends in a direction aligned substantially orthogonal to sections of the outer peripheral edge of the main portion that extend along a longitudinal direction of the main portion.

4. The plate fitted resin molded article of claim 1, wherein the groove extends towards a center of the recess.

5. The plate fitted resin molded article of claim 1, wherein the plate is at least partly exposed on an outer surface of the main portion.

6. The plate fitted resin molded article of claim 5, wherein the plate has at least one converging hole with a gradually reduced diameter at positions from the exposed surface of the plate toward an opposite surface of the plate.

7. The plate fitted resin molded article of claim 6, wherein at least one anchor is molded unitarily with the main portion substantially in conformity with the shapes of the hole.

8. The plate fitted resin molded article of claim 1, wherein a communicating portion for molten resin is provided at the outer edge of the bottom end of the groove.

9. A plate-fitted resin molded article, comprising:
   a metal plate with opposite first and second surfaces; and
   an elongated resin main portion defining a longitudinal direction and having a plurality of peripheral edges extending substantially along the longitudinal direction, the main portion being molded to be integral to the second surface of the plate so that the first surface of the plate is exposed, the main portion being formed with at least first and second recesses for receiving at least first and second electronic parts, at least first and second grooves formed in the main portion and extending respectively from the first and second recesses to at least one of peripheral edges that extends substantially along the longitudinal direction of the main portion.

10. The plate fitted resin molded article of claim 9, wherein each of said grooves extends substantially orthogonally to the respective peripheral edge of the main portion.

11. The plate fitted resin molded article of claim 9, wherein the first and second recesses each are substantially round holes.

12. The plate fitted resin molded article of claim 9, wherein the second surface of the plate is at least partly exposed at the first and second recesses.

13. The plate fitted resin molded article of claim 9, wherein the plate has at least one converging hole with a reduced cross-section at positions spaced from the first surface of the plate and closer to the second surface of the plate.

14. The plate fitted resin molded article of claim 13, wherein at least one anchor is molded unitarily with the main portion and substantially filling the hole.

15. A method of molding a plate fitted resin molded article, comprising:
    providing a plate; and
    molding a resin main portion to be integral to the plate and formed with at least one recess for receiving at least one electronic part and with at least one groove extending between a peripheral edge of the recess and an outer peripheral edge of the main portion.

16. The method of claim 15, wherein the step of providing the plate comprises providing the plate with at least one converging hole with a gradually reduced diameter at positions farther from an exposed surface of the plate towards an opposite surface of the plate.

17. The method of claim 16, wherein the step of molding the resin main portion comprises molding at least one anchor unitary with the main portion and in conformity with a shape of the hole.

* * * * *